United States Patent [19]

Orlosky

[11] Patent Number: 4,693,446

[45] Date of Patent: Sep. 15, 1987

[54] GASKET FOR MOLDING PLASTIC LENSES

[75] Inventor: Henry Orlosky, Irvine, Calif.

[73] Assignee: Techna Vision, Inc., Santee, Calif.

[21] Appl. No.: 778,321

[22] Filed: Sep. 20, 1985

[51] Int. Cl.$^4$ .............................................. B29D 11/00
[52] U.S. Cl. ..................................... 249/53 R; 249/82;
249/105; 249/155; 249/187 R; 264/2.2;
425/808
[58] Field of Search .............. 249/53 R, 82, 102, 126,
249/134, 154, 155, 159, 105, 187 R; 425/808,
543, 555, 812; 264/2.2, 313, 314, 328.7

[56] References Cited

U.S. PATENT DOCUMENTS

| | | | |
|---|---|---|---|
| 2,193,742 | 3/1940 | Rohm et al. | 351/159 |
| 2,304,217 | 12/1942 | Tillyer | 425/808 |
| 2,497,451 | 2/1950 | Haefeli | 525/309 |
| 2,745,138 | 5/1956 | Beattie | 249/82 |
| 2,964,501 | 12/1960 | Sarofeen | 425/808 |
| 3,037,245 | 6/1962 | Darnell | 425/DIG. 227 |
| 3,038,210 | 6/1962 | Hungerford et al. | 264/2.6 |
| 3,056,166 | 10/1962 | Weinberg | 249/102 |
| 3,070,846 | 1/1963 | Schrier | 425/808 |
| 3,109,696 | 11/1963 | Whitney | 264/2.5 |
| 3,136,000 | 6/1964 | Slyk | 249/141 |
| 3,211,811 | 10/1965 | Lanman | 264/2.3 |
| 3,220,960 | 11/1965 | Wichterle | 521/149 |
| 3,221,083 | 11/1965 | Crandon | 264/2.6 |
| 3,222,432 | 12/1965 | Grandperret | 264/2.3 |
| 3,228,915 | 1/1966 | Sauer et al. | 526/227 |
| 3,240,854 | 3/1966 | Ewer | 264/236 |
| 3,265,763 | 8/1966 | Deichert et al. | 525/44 |
| 3,278,654 | 10/1966 | Grandperret | 264/2.2 |
| 3,331,102 | 7/1967 | Mignen | 425/470 |
| 3,337,659 | 9/1967 | Grandperret | 264/2.2 |
| 3,380,718 | 4/1968 | Neefe | 264/2.2 |
| 3,391,224 | 7/1968 | Sherr et al. | 525/41 |
| 3,404,861 | 10/1968 | Ewer | 249/187 R |
| 3,422,168 | 1/1969 | Bowser | 264/2.2 |
| 3,460,928 | 8/1969 | Casko | 65/39 |
| 3,528,135 | 9/1970 | Reiterman | 425/195 |
| 3,542,907 | 11/1970 | Wichterle | 264/2.6 |
| 3,555,610 | 1/1971 | Reiterman | 425/472 |
| 3,555,611 | 1/1971 | Reiterman | 425/195 |
| 3,605,195 | 9/1971 | Campbell | 249/164 |

(List continued on next page.)

FOREIGN PATENT DOCUMENTS 1945321 3/1971 Fed. Rep. of Germany ....... 264/2.2
59-106936 6/1984 Japan ................................... 425/808
1435329 5/1976 United Kingdom .

OTHER PUBLICATIONS

*Laboratory Apparatus and Reagants,* Arthur H. Thomas Company Catalog, Philadelphia, PA, 1950, pp. 472–475, and pp. 760–761, copy in Design Library.
"Introducing the CLC-10", Aperture International Optics, four page brochure with 1983 copyright notice.
"OptiMold I", Optical Molding Systems, Inc., four page brochure–no date can be found in the brochure.

*Primary Examiner*—Jay H. Woo
*Assistant Examiner*—James C. Housel
*Attorney, Agent, or Firm*—John J. Connors

[57] ABSTRACT

A clear, cylindrical, flexible gasket having an annular shoulder located on the interior surface thereof, midway between the ends. The gasket is sized to accept two lens half molds, one on either side of said shoulder to form a lens casting cavity. Each side of the shoulder has first and second annular protrusions extending therefrom for contacting and providing an annular double seal along the edges of each of the half molds. The surface of the shoulder which forms the side of the lens casting cavity is curved in order to reduce stress to a minimum during the shrinkage of the lens casting resin during the cure period. In addition, the casting surface of the shoulder is formed such that the final molded lens will have an outer ridge thereon. One end of the cylindrical gasket has an enlarged edge for additional strength and is provided with index markings thereon which extend beyond the edge and down the outer side of the clear gasket. Two identical fill ports are provided on opposite sides of the gasket. A necked down portion is provided at the point where the filling passage connects with the lens casting surface of the shoulder so that as the plastic resin of the lens being molded cures and shrinks, the plastic in the fill passage is automatically severed from the plastic which forms the final plastic lens product.

8 Claims, 7 Drawing Figures

U.S. PATENT DOCUMENTS

| | | | |
|---|---|---|---|
| 3,619,044 | 11/1971 | Kamath | 351/110 |
| 3,635,544 | 1/1972 | Stamm et al. | 350/354 |
| 3,673,055 | 6/1972 | Sheld | 428/412 |
| 3,700,761 | 10/1972 | O'Driscoll et al. | 264/1.4 |
| 3,711,417 | 1/1973 | Schuler | 252/585 |
| 3,728,317 | 4/1973 | Blank | 525/330.2 |
| 3,761,208 | 9/1973 | Boudet et al. | 264/2.2 |
| 3,821,333 | 6/1974 | Goodwin et al. | 428/65 |
| 3,839,304 | 10/1974 | Hovey | 526/73 |
| 3,872,042 | 3/1975 | Bond | 524/710 |
| 3,881,683 | 5/1975 | Whitney | 425/808 |
| 3,902,693 | 9/1975 | Crandon et al. | 249/134 |
| 3,915,609 | 10/1975 | Robinson | 425/174.6 |
| 3,938,775 | 2/1976 | Sarofeen | 264/2.2 |
| 3,940,304 | 2/1976 | Schuler | 156/245 |
| 3,944,637 | 3/1976 | Bond et al. | 264/1.1 |
| 3,946,982 | 3/1976 | Calkins et al. | 249/102 |
| 3,987,362 | 7/1976 | Laliberte | 350/397 |
| 4,008,031 | 2/1977 | Weber | 264/2.2 |
| 4,085,919 | 4/1978 | Sullivan | 249/134 |
| 4,089,926 | 5/1978 | Taylor | 425/547 |
| 4,090,830 | 5/1978 | Laliberte | 425/117 |
| 4,091,057 | 5/1978 | Weber | 264/2.2 |
| 4,095,772 | 6/1978 | Weber | 249/82 |
| 4,113,224 | 9/1978 | Clark et al. | 249/105 |
| 4,121,896 | 10/1978 | Shepherd | 425/412 |
| 4,123,407 | 10/1978 | Gordon | 523/108 |
| 4,132,518 | 1/1979 | Rips | 425/143 |
| 4,139,578 | 2/1979 | Baughman et al. | 525/39 |
| 4,141,941 | 2/1979 | Travnicek | 264/2.6 |
| 4,146,696 | 3/1979 | Bond et al. | 526/194 |
| 4,150,073 | 4/1979 | Neefe | 264/1.1 |
| 4,163,541 | 8/1979 | Campbell | 249/117 |
| 4,163,655 | 8/1979 | Campbell | 65/17 |
| 4,166,088 | 8/1979 | Neefe | 425/808 |
| 4,173,606 | 11/1979 | Stoy et al. | 264/2.6 |
| 4,190,621 | 2/1980 | Greshes | 425/808 |
| 4,191,717 | 3/1980 | Weber | 264/313 |
| 4,197,266 | 4/1980 | Clark et al. | 264/2.2 |
| 4,208,365 | 6/1980 | LeFevre | 264/2.2 |
| 4,217,433 | 8/1980 | Dyball | 525/277 |
| 4,227,673 | 10/1980 | Goodwin et al. | 249/117 |
| 4,246,207 | 1/1981 | Spycher | 264/2.6 |
| 4,248,989 | 2/1981 | Novicky | 526/264 |
| 4,251,474 | 2/1981 | Blandin | 425/808 |
| 4,252,753 | 2/1981 | Rips | 264/1.1 |
| 4,257,988 | 3/1981 | Matos et al. | 425/808 |
| 4,260,564 | 4/1981 | Baiocchi et al. | 264/2.2 |
| 4,273,809 | 6/1981 | LaLiberte et al. | 427/155 |
| 4,279,401 | 7/1981 | Ramirez et al. | 249/139 |
| 4,284,591 | 8/1981 | Neefe | 264/1.1 |
| 4,287,227 | 9/1981 | Kamada et al. | 427/54.1 |
| 4,300,821 | 11/1981 | Mignen | 351/163 |
| 4,306,780 | 12/1981 | Tarumi et al. | 351/159 |
| 4,322,803 | 3/1982 | Ullner | 364/473 |
| 4,326,255 | 4/1982 | Fujita | 364/476 |
| 4,344,142 | 8/1982 | Diehr, II et al. | 364/473 |
| 4,346,197 | 8/1982 | Crano et al. | 525/277 |
| 4,364,878 | 12/1982 | Laliberte et al. | 264/2.2 |
| 4,368,062 | 1/1983 | Mapes et al. | 65/29 |
| 4,376,800 | 3/1983 | Lu et al. | 428/220 |
| 4,383,672 | 5/1983 | Kreuttner | 249/134 |
| 4,393,184 | 7/1983 | Tarumi et al. | 526/261 |
| 4,402,721 | 9/1983 | Ericson et al. | 65/29 |
| 4,408,016 | 10/1983 | Eads et al. | 525/277 |
| 4,413,104 | 11/1983 | Deubzer et al. | 525/479 |
| 4,419,505 | 12/1983 | Ratkowski et al. | 526/279 |
| 4,426,505 | 1/1984 | Minns | 526/283 |
| 4,433,125 | 2/1984 | Ichinohe et al. | 526/279 |
| 4,441,795 | 4/1984 | Lobdell | 249/103 |
| 4,522,768 | 6/1985 | Roscrow et al. | 249/134 |

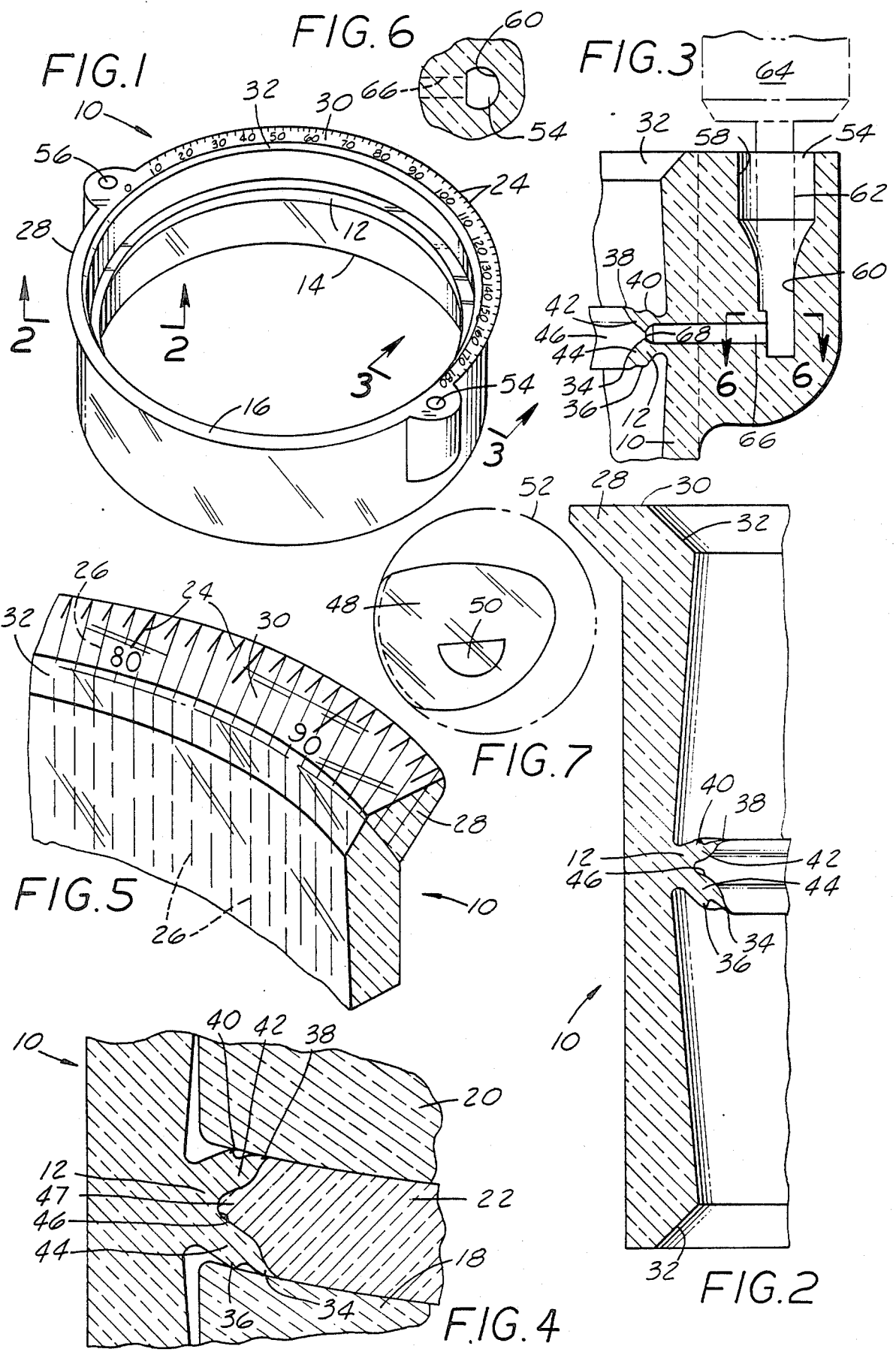

4,693,446

GASKET FOR MOLDING PLASTIC LENSES

BACKGROUND OF THE INVENTION

This invention relates to the molding of plastic optical lenses, and in particular to the molding of plastic ophthalmic lenses.

Over the years many techniques have been developed for molding plastic lenses. Generally, these techniques involve arranging two circular lens mold elements, hereinafter called "half molds," in a parallel orientation to form a casting cavity therebetween. Thge half molds are generally made of glass and have surfaces which are selected to provide a desired curvature on either side of a finished lens. Liquid resin material is inserted between the two glass molds and cured. Depending on the resin involved, the curing can take place through the use of a catalyst and/or raising the temperature of the resin. One well-known polymer which provides excellent results for production of plastic lenses is a polycarbonate produced from allyl digycol carbonate and sold under the trademark CR39.

When the CR39 resin is used, curing is generally done at an elevated temperature. Curing techniques for the resin are well known in the art. Prior U.S. patents showing the use of two glass mold halves to form a molding cavity for a plastic resin are U.S. Pat. No. 4,190,621 issued to Greshes on Feb. 26, 1980 and U.S. Pat. No. 4,227,673 issued to Goodwin, et al on Oct. 14, 1980. The subject matter of these patents is hereby incorporated by reference.

In filling a prescription for an ophthalmic lens, there are ordinarily two types of corrections which are routinely made. One is magnification or minification depending on whether a given person is farsighted or nearsighted. This correction is usually made by providing curves on both sides of the lens. Each of these curves is symmetrical about the central axis of the lens. For this reason the magnification and minification corrections can be made without regard to orientation of the two halves of the mold.

The other correction is for astigmatism. This correction usually involves creating a slight cylindrical cut into the lens along an axis which is substantially parallel to the surface of the lens and passes through the central axis. In order to properly correct an individual's astigmatism the astigmatic axis must be oriented at the particular angle with respect to the individual's eye which the doctor has prescribed. Thus, the lens mold half which carries an astigmatism correction will usually have its astigmatic axis marked thereon. This axis should also be noted on the lens itself so that when the lens is cut for putting into a pair of frames the axis is at the proper angle.

Where a magnification or minification correction along with an astigmatism correction are the only corrections to be made by the opthalmic lens being cast, there is no need for any specific orientation of the mold half carrying the astigmatism correction with respect to the other mold half. All that needs to be done is to note where the astigmatism correction axis is on the lens so that when the lens is cut for a given pair of eyeglass frames the axis is at the correct angle with respect to the wearer's eyes.

However, where a bifocal is to be included in the lens being cast, then the astigmatism axis must be oriented properly with respect to the bifocal segment. In order to provide the proper arrangement of the astigmatism correction axis with respect to the bifocal segment, it has been found convenient to have protractor style index markings directly on the lens casting mold so that the axis line marked on the glass half mold carrying the astigmatism correction can be properly oriented. This problem is dicussed in detail in the Greshes patent.

It is desirable to provide the index markings at a location on the lens casting mold that is adjacent the location of the half mold carrying the astigmatism correction. However, when a flexible gasket is used, it has been found that the markings cannot conveniently be made on the interior surface of the flexible gasket because they tend to interfere with the insertion and holding of the half mold. If the markings are placed only on the outer surface of the gasket they must be viewed through the inner surface and are subject to some parallax error due to the diference in index of refraction between the ambient air and the gasket material. Further, if the markings are placed only on one of the ends of the gasket, some errors are likely to occur due to the fact that the markings are not directly adjacent the mold half carrying the astigmatism correction.

Although there are other ways to cast lenses, such as that disclosed by the Greshes patent, the most common method now being used is to seal the cavity between the two mold halves using a cylindrical gasket. The cylindrical gasket is often referred to as a "T-type" gasket because in cross-section it has an inner annular shoulder approximately half way between each end of the cylindrical gasket. The sides of the shoulder are intended to seal the edges of each of two opposing, circular glass mold halves. Sealing the edges of the casting cavity is important because exposure to air can cause changes in the cure rate of the portion of the resin which is exposed to the air. Thus, in order for the resin to harden uniformly it is preferable to have as little exposure to outside air as possible. Further, during the curing process of the resin, the newly forming lens will actually shrink a substantial amount. For the resin, CR39, the shrinkage is approximately 14%. Thus, there must be some flexibility in the shoulder to allow the two mold halves to approach each other somewhat while maintaining the seal.

Another critical concern in casting plastic lenses using flexible gaskets is how to fill the cavity between the two mold halves so that a minimum of air is trapped in the resin.

SUMMARY OF THE INVENTION

A new and substantially improved lens gasket has been developed which overcomes the problems discussed above and provides additional advantages not suggested or disclosed in the prior art.

In one aspect of the invention, a clear, plastic, optical lens molding gasket is provided with index markings on one end thereof and extending over its edge onto the gasket's outer surface. This allows for index markings to be adjacent the astigmatic axis marking on the half mold. In addition, it permits the user to avoid any parallax error by aligning the proper index marking on the end of the gasket with the corresponding marking on the outside surface of the gasket.

In another aspect of the invention, an enlarged annular edge has been provided at the end of the gasket which holds the index markings. The edge acts to both strengthen the gasket as well as to provide a wide, flat surface for easy reading of the index markings.

In a further aspect of the invention, a plastic lens molding gasket is provided having an inner annular shoulder with a double seal on either side thereof to make a sure seal between the gasket and the respective glass mold halves. In another aspect of the invention, the surface of the shoulder, which forms the side of the lens casting cavity is rounded to substantially reduce any stress within the final lens product caused by shrinkage of the resin during the cure process. In a further aspect of the invention, the annular casting surface of the shoulder has an annular recess therein which creates a ridge on the edge of the final lens product. This ridge can be used to assist in directly mounting the lens into an eyeglass frame.

In another aspect of the invention, the fill hole has a necked down portion at the point where the resin enters the casting cavity through the annular shoulder. This provides a stress point as the resin is hardening such that during shrinkage of the resin the portion of the resin which forms the lens will automatically break off from the portion of the resin left in the fill passage. Thus, no excess plastic needs to be removed from the edge of the lens.

In a further aspect of the invention, the fill and vent holes are positioned horizontally and across from one another to permit the resin to fill the lens casting cavity across from side to side in order to minimize the undesirable entrapment of gas within the resin.

BRIEF DESCRIPTION OF THE DRAWINGS

FIG. 1 shows a perspective view of the plastic lens molding gasket of the present invention;

FIG. 2 is a partial cross-sectional view of the gasket of FIG. 1 taken along line 2—2 of FIG. 1;

FIG. 3 is a partial cross-sectional view of the gasket of FIG. 1 taken along line 3—3 of FIG. 1;

FIG. 4 is a partial cross-sectional view of the gasket of FIG. 1 showing a detail of the double seal shoulder in use, with upper and lower mold halves in place;

FIG. 5 is a detailed view of an upper portion of the gasket of FIG. 1 showing the index markings;

FIG. 6 is a cross-sectional view of the fill hole shown in FIG. 3 taken along line 6—6 of FIG. 3; and FIG. 7 shows an example of how a round lens, created using a gasket made in accordance with the present invention, might be ground to fit in an eyeglass frame.

DETAILED DESCRIPTION OF THE PREFERRED EMBODIMENT

Referring now to the drawings and in particular to FIGS. 1, 2, 4 and 5, the improvement to the index markings used in connection with a plastic lens molding gasket will be described. FIG. 1 shows a plastic lens molding gasket 10 formed in a generally cylindrical shape. It can be seen that the length of the cylinder is much shorter than its diameter. The gasket 10 itself is advantageously made of a flexible plastic material, compatible with the resin to be used to make the lens. Polyvinyl chloride (PVC) has been found to be a preferred material for use in making these gaskets. In addition, PVC has been found to work quite well when CR39 resin is used to cast the lens. Any flexible material, however, which does not react with the lens casting resin can be used to form the gasket. For example, other suitable materials include soft polymethyl methacrylate and polyethylene.

An annular shoulder 12 is formed on the inside surface of the cylindrical gasket 10 about halfway between the opposite ends 14,16 thereof. This shoulder is intended to accommodate and seal the edges of two opposing circular lens mold halves. Although the complete circular lens mold halves are not shown in the drawings, one of ordinary skill in the art will readily recognize that the mold halves fit within the inner circumference of the cylindrical gasket 10 on either side of the shoulder 12. FIG. 4 shows an enlarged cross-sectional view of a portion of the lens molding gasket 10. This view shows the annular shoulder 12 in contact with two opposing glass mold halves 18,20. These mold halves 18,20 are selected to have a curvature which provides the required correction for the lens to be molded. It can be seen that when the two mold halves, often made of glass, are placed adjacent one another in the gasket 10 and abutting the shoulder 12, they form a lens molding cavity 22. This cavity 22 is in the shape of the circular lens which will be formed after the cavity is filled with resin and the resin is cured. In FIG. 4 cavity 22 is shown filled with the resin that will form the final lens product.

As discussed previously, when an ophthalmic lens having a minification or magnification correction, an astigmatism correction and a bifocal segment is to be created, it is necessary to align the astigmatic axis of the mold half carrying the astigmatism correction properly with respect to the position of the bifocal segment. Generally, where a lens mold half carries an astigmatism correction, it will also include a marking thereon which indicates the axis of the astigmatic correction. In order to facilitate proper orientation of this axis with respect to the bifocal segment, a series of protractor-like index markings 24 are made along the upper edge of the gasket. These markings can be made along one half of the end surface of the gasket, as shown in FIG. 1, or around the entire end of the gasket.

It is desirable to have the markings be as close to the mold half as possible so as to avoid judgment errors in positioning. However, it is also desirable to have a smooth inner surface to help guide the mold half into place in the mold. Thus, it has been found to be undesirable to have the markings located on the inner surface of the gasket itself.

One possible solution is to provide the markings on the outside of a clear gasket and then to arrange the astigmatic axis marking on the half mold in accordance with the protractor markings as seen through the clear gasket. The problem with this approach is that there is some significant thickness between the inner surface of the gasket and the outer surface of the gasket where the markings are indicated. This thickness can result in some parallax error due to the difference in index of refraction between air and the clear PVC gasket.

In accordance with the invention the parallax error is eliminated by providing index markings 24 on the upper edge surface as well as corresponding index markings 26 on the outer surface of the gasket as shown in FIG. 5. When using a gasket made in accordance with this invention, the user will first orient his eyes such that the proper index marking on the upper edge surface of the gasket, lines up with the corresponding marking on the outer surface of the gasket. While maintaining these markings aligned the user will then orient the astigmatic axis marking of the half mold with the proper index marking as seen through the gasket. In this way the parallax error can be eliminated.

The index markings 24,26 on the end of the gasket and on the outer surface thereof can be provided in any convenient manner. For example, the markings can be molded into the gasket 10 or they can be printed on after the gasket 10 has been formed. Further, although the index lines 24,26 are shown in FIG. 5 as extending continuously from the end surface over the edge of the gasket and onto the side surface, they need not be marked in this way. For example, discontinuous lines or dots could be used. The only requirement is that the index markings 24 on the end surface of the gasket be capable of being easily matched with the corresponding index markings 26 on the outer surface of the gasket. In order to provide the index markings as close as possible to the half mold astigmatic axis marking, it is advantageous to have at least a portion of the markings on the outer surface extend to a point adjacent the shoulder 12.

The enlarged flanged edge 28 at the upper end of the gasket provides two important functions. First it acts to strengthen the outer portion of the gasket 10 without the need to add additional material to the entire wall of the gasket. Additionally, this enlarged annular edge 28 provides a convenient flat surface 30 having sufficient thickness to make the reading of the index numbers and lines 24 very easy.

Referring now to FIGS. 1-4 and 7, the annular shoulder 12 will be described in some detail. As discussed previously, in order to form the lens casting cavity, two half molds are positioned within the inner circumference of the gasket 10, one on either side of the shoulder 12. The half molds are usually made of glass and have a diameter equal to or slightly greater than the inner diameter of the plastic lens molding gasket 10. From FIG. 2 it can be seen that there is a beveled surface 32 angled at about 45 degrees on both of the ends 14, 16 of the gasket 10 to permit the mold halves to be more easily urged into place. In addition, there is a taper in the wall of the lens molding gasket on both sides of the shoulder which again is best seen in FIG. 2. This taper is angled inwardly from the shoulder 12 outwardly to the respective ends 14, 16 of the gasket to help hold both of the half molds in place. The half molds are urged into contact with the shoulder 12 as best shown in FIG. 4.

As can be seen in FIGS. 2, 3, and 4, the shoulder 12 is formed in a V-shape. One arm of the "V" extends upwardly to contact the bottom surface of the upper glass mold 20 and the other arm of the "V" extends downwardly to contact the upper surface of the lower glass mold half 18. Applicant has found that the best seal is formed by providing two separate, concentric annular lips 34,36 and 38,40 to contact each of the mold halves 18,20. The first lip 34,38 of each arm will usually be a sufficient seal against most leakage. The second annular, concentric lip 36,40 of each arm which surrounds the first annular lip, will act as a back up seal.

As discussed previously, the seal between the gasket shoulder and the mold half is important because any air that comes in contact with the resin will change that portion of the resin's curing time. Thus, if some air does come in contact with the edges of the resin which is being formed into a lens, the final lens product may be completely cured with some liquid resin left over on the sides. This remaining liquid resin is quite messy and hard to clean off should it get on the finished lens product.

It should also be pointed out that the angle of the upper "V" arm 42, of the shoulder 12 with respect to the horizontal, best seen in FIG. 2, is slightly less than the downward angle of the lower "V" arm 44 of the shoulder 12. The angle of the upper arm 42 of the shoulder 12, with respect to the horizontal, is advantageously about 5 degrees while the angle that the lower arm 44 makes with the horizontal is advantageously about 30 degrees. This is to accommodate the differences in the curves of the lens mold halves with which the seals 34,36,38,40 on these arms 42,44 are to come in contact. In particular, the seals 34,36 on the lower arm 44 of the shoulder 12 will generally come in contact with a concave mold surface while the upper seals 38,40 will generally come in contact with a convex mold surface. The reason for this is that if there are any bubbles in the resin they will float to the top against the downwardly facing convex surface of the upper mold half, Due to the convex shape the bubbles will be pushed to the outer edges of the lens being formed and in this position they can easily be removed by edge grinding.

The surface 46 of the shoulder 12 which forms the side of the lens casting cavity is curved so as to reduce any stress which would otherwise occur if there were more acute edges. Stress that occurs in the lens resin as it cures and shrinks can cause cracking during the curing process and thereafter. By providing these curved edges the stress buildup is substantially reduced and therefor it is less likely that a crack will occur. It should be recalled that during the curing process the resin shrinks by a substantial percentage of its volume. As discussed previously, in the case of CR39 resin, the shrinkage is in the range of 14%. As the resin shrinks, the arms 42,44 of the shoulder 12 will come closer togehter. The curved surfaces permit much easier accommodation of this change in volume. It has been found that the radius of curvature for these curves is advantageously at least one half millimeter and preferably somewhat larger.

The V-shaped annular curve on the casting cavity surface of the shoulder shown in FIGS. 2, 3, and 4, provides an additional advantage in that when the lens hardens it has a protrusion 47 at its edge. This is the type of protrusion which is often needed for mounting a lens in a eyeglass frame. When lenses are cast they usually come out in a round shape with substantially flat edges. The lens is then put into a grinding machine which grinds it down to the proper shape so that it can be fit into a desired eyeglass frame. This grinding includes the provision of a protrusion to be used in mounting the lens in an eyeglass frame. Sometimes however, the desired eyeglass frame requires a fairly large lens and in order to put the center of the lens in the proper location with respect to a given individual's pupil, the lens may, in some cases, need to be ground very close to its edge.

FIG. 7 shows an example of a lens 48 having a bifocal segment 50. Before being ground for putting into a eyeglass frame, the lens is circular as shown by the dotted circular line 52. When ground, it turns out, in this example, that it would be desirable to use the very edge of the original round lens 52 as part of the edge of the final lens 48 to be fit into an eyeglass frame. Ordinarily this would be very dfficult, it not impossible to do, because the edge of the round lens would be flat. In such cases the optician would be tempted to move the center of the lens slightly out of alignment with the individual's pupil. However, in accordance with this invention the edge provided by the V-shaped shoulder provides an annular ridge 46 on the edge of the lens which can be used as a part of the fiinal ground lens to fit into an eyeglass frame. Thus, by providing a V-shaped ridge 46 on the edge of the lens during casting, the diameter of the lens is effectively increased without actually increasing the diameter of the gasket 10.

Filling the casting cavity 22 created by the two adjacent lens mold halves is a tricky procedure. The objective is to attempt to fill the cavity while including as few gas molecules in the resin as possible. This is done in the present invention by providing two holes 54,56, communicating through the shoulder with the casting cavity 22, located diametrically across from one another. One of these holes 54 is shown in cross-section in FIG. 3. The other hole is identical to the one shown in FIG. 3. Either one of the two holes 54,56 can be used as a fill hole and the other hole will act as a vent hole. The fill/vent hole shown in FIG. 3 has an upper wide cylindrical portion 58 tapering down to a more narrow cylindrical portion 60. This more narrow portion 60 is designed to frictionally and sealingly accept the tip 62 of a resin reservoir 64 shown in dotted lines in FIG. 3. Once this reservoir tip is inserted the resin is forced into the opening, through the horizontal passage 66, through the shoulder 12 and then into the lens casting cavity. By introducing the resin at a relatively slow rate, while maintaining the lens casting cavity in a horizontal position, it has been found that the resin completely fills the cavity. The apparent reason for this is that the resin is relatively viscous. As the resin enters the casting cavity it sticks together and competely fills the cavity as it moves from one side to the other. As the lens casting cavity is filling, the air in the cavity is pushed out through the vent hole.

An additional advantage is found in that even if the mold halves are opaque, a user can determine when the lens casting cavity is filled by merely monitoring the opening used as a vent hole to see when the resin has begun to fill it. As soon as resin is seen filling the vent hole, the user knows that the casting cavity is full. This filling system, whereby the lens cavity is filled from side-to-side while the gasket is kept in a horizontal position, allows for much faster and bubble-free filling than was previously possible in the art.

Referring now to FIG. 3, it can be seen that the opening between the horizontal passage 66 and the lens casting cavity 22 is restricted by an annular necked down portion 68. This annular protrusion 68 acts to narrow the passage 66 and restrict the flow of fluid from the resin dispenser 64 to the interior of the casting cavity 22. After the casting cavity 22 has been filled, the resin will begin to cure and shrink. Upon shrinking, a stress point will be created at the restricted area 68. Due to the stress point, the portion of the resin forming the lens breaks off from the portion of the curing resin which is in the resin fill and vent holes. This break-off happens automatically and avoids the need to remove any extra plastic pieces at a later time.

What is claimed is:

1. A gasket for holding a pair of half molds used in casting plastic lenses, comprising:
    an annular body formed by a cylindrical wall having an inside surface, an outside surface, and first and second opposing annular ends,
    an annular shoulder along said inside surface of said wall and disposed about midway between said opposing ends, said shoulder being formed by two seal members which extend outwardly from said inside surface from a common junction, and
    a pair of diametrically opposed protrusions on said outside surface of the wall, each of said protrusions having a face surface adjacent one of said ends and a passageway extending therethrough, and
    each of said passageways having one end in the face surface of the protrusions through which the passageway extends, and another end extending through said wall and opening at said common junction.

2. The gasket of claim 1 wherein the annular body is made of a transparent material, said body having index markings at one end for adjusting the annular displacement of half molds held by said gasket and corresponding index markings on the outside surface enabling a user to properly orient an astigmatic axis of a half mold.

3. The gasket of claim 1 wherein the common junction is in the form of a curved surface where the radius of curvature is greater than one-half of a millimeter.

4. The gasket of claim 3 wherein the passageways each have a necked-down portion adjacent said curved surface.

5. The gasket of claim 1 wherein each seal member has an outer surface facing away from the other seal member, said seal member outer surface having a pair of lips.

6. A gasket for holding a pair of half molds used in casting plastic lenses, comprising:
    a annular body made of a flexible plastic material and formed by a cylindrical wall having an inside surface, and outside surface, and first and second opposing annular ends,
    an annular shoulder along said inside wall and disposed about midway between said opposing ends, said shoulder being formed by two seal members which extend divergently outwardly from said inside surface from a common junction, said seal members each having on their respective outer surfaces a pair of lips and said common wall being in the form of a curved surface when the radius of curvature is greater than one-half a millimeter,
    a pair of diametrically opposed protrusions on said outside surface of said wall, each of said protrusions having a face surface adjacent one of said ends and a passageway extending therethrough, and
    each of said passageways having one end in the face surface of the protrusion through which the passageway extends and another end extending through said wall and opening at said common junction.

7. The gasket of claim 6 wherein the plastic material is transparent and index markings are at one end of the wall to enable a user to orient an astigmatic axis of a half mold.

8. The gasket of claim 7 wherein the passageways each have a necked-down portion adjacent said curved surface.

* * * * *